(12) United States Patent
Luo et al.

(10) Patent No.: US 7,786,396 B2
(45) Date of Patent: Aug. 31, 2010

(54) KEY-PRESS STRUCTURE AND A METHOD FOR MAKING THE SAME

(75) Inventors: Wenhai Luo, Shenzhen (CN); Lihong Zhao, Shenzhen (CN); Feng Cheng, Shenzhen (CN); Jiaxin Zhang, Shenzhen (CN)

(73) Assignee: BYD Co. Ltd., Pingshan, Longgang, Shenzhen (CN)

( * ) Notice: Subject to any disclaimer, the term of this patent is extended or adjusted under 35 U.S.C. 154(b) by 0 days.

(21) Appl. No.: 12/342,509

(22) Filed: Dec. 23, 2008

(65) Prior Publication Data

US 2009/0166169 A1 Jul. 2, 2009

(30) Foreign Application Priority Data

Dec. 27, 2007 (CN) .................. 2007 1 0301488

(51) Int. Cl.
*H01H 13/83* (2006.01)
(52) U.S. Cl. .................. 200/314; 200/310; 200/313
(58) Field of Classification Search .................. 200/310, 200/314, 317; 400/490, 472, 493, 494, 495; 341/22, 23, 28; 345/168–171, 176; 362/26, 362/27, 616
See application file for complete search history.

(56) References Cited

U.S. PATENT DOCUMENTS

| | | | |
|---|---|---|---|
| 5,128,842 A * | 7/1992 | Kenmochi | 362/95 |
| 5,225,818 A * | 7/1993 | Lee et al. | 345/170 |
| 6,568,819 B1 * | 5/2003 | Yamazaki et al. | 362/619 |
| 6,631,998 B2 * | 10/2003 | Egawa et al. | 362/612 |
| 6,733,148 B2 * | 5/2004 | Nishioka | 362/26 |
| 6,871,973 B2 * | 3/2005 | Ju | 362/26 |
| 7,147,357 B2 * | 12/2006 | Kim et al. | 362/608 |
| 7,232,969 B1 * | 6/2007 | Hsu et al. | 200/310 |
| 7,244,899 B2 * | 7/2007 | Jung et al. | 200/314 |
| 7,411,142 B2 * | 8/2008 | Jung et al. | 200/314 |
| 7,414,213 B2 * | 8/2008 | Hwang et al. | 200/341 |
| 7,462,794 B2 * | 12/2008 | Lee et al. | 200/314 |

FOREIGN PATENT DOCUMENTS

| | | |
|---|---|---|
| CN | 1855332 A | 11/2006 |
| CN | 1892949 A | 1/2007 |
| CN | 101150020 A | 3/2008 |
| EP | 0414366 A2 | 2/1991 |

* cited by examiner

*Primary Examiner*—Michael A Friedhofer
(74) *Attorney, Agent, or Firm*—Brinks Hofer Gilson & Lione

(57) ABSTRACT

In one aspect, a key-press structure comprises a frame and a plurality of keys disposed in said frame. Said frame comprises a main portion and two reflecting portions. The main portion has two opposite sides and the two reflecting portions are disposed on the two opposite sides of the main portion, respectively. Said reflecting portion has a reflective surface facing toward the main portion. Said keys are made of a transparent material, and the keys comprise characters formed on the internal surface of said keys. In another aspect, a method of preparing a key-press structure comprises forming a frame that includes a main portion and two reflecting portions. The reflecting portions each have a reflective surface. The main portion has two opposite sides that is connected to the two reflecting portions. The method further comprises forming characters on the internal surface of a plurality of keys, and disposing said keys in the main portion of the frame.

20 Claims, 2 Drawing Sheets

KEY-PRESS STRUCTURE AND A METHOD FOR MAKING THE SAME

The present application claims priority to Chinese Patent Application No. 200710301488.1, filed Dec. 27, 2007, the entirety of which is hereby incorporated by reference.

FIELD OF THE DISCLOSURE

The present disclosure relates to the cell phone field, more specifically to a key-press structure of cell phones and a method for making the same.

BACKGROUND OF THE DISCLOSURE

As a result of the development of the cell phone industry, cell phones have already become a must-have communication tool. To showcase the fashion of cell phones, mobile phone designers try to design cell phones with different qualitative sensation and appearances by changing cell phone materials.

At present, the conventionally used key-press material of cell phones is either plastic or metallic. A few companies use crystal material to manufacture cell phone key-presses. A typical key-structure is showed in FIG. 1. First, a film 2 is coated or plated onto the surface of cell phone key-press 1 via printing or plating. Then part of the coated or plated film 2 on the surface of the key-press 1 is removed via laser carving to form carved out characters 3. Subsequently, a light-guide 4 which guides light upwards is disposed under the key-press 1 such that the light from a light source (not shown) will transmit from under the carved out characters 3. In order to protect the characters on the surface of the key, a protection layer 5 is disposed on the film 2 of the key 1. However, after prolonged use, the characters on the conventional key-press surface are still easily worn out. Therefore, to prevent the wear and tear of the characters on the surface of the key, some companies internally laser carve the key-press which is made up of PC, ABS or other plastic materials. However, due to the characteristics of the materials themselves, the cracking point inside the key-press after laser carving is black, which leads to a poor light guide effect.

SUMMARY OF THE INVENTION

In one aspect, a key-press structure comprises a frame and a plurality of keys disposed in said frame. Said frame comprises a main portion and two reflecting portions. The main portion has two opposite sides and the two reflecting portions are disposed on the two opposite sides of the main portion, respectively. Said reflecting portion has a reflective surface facing toward the main portion. Said keys are made of a transparent material, and the keys comprise characters formed on the internal surface of said keys.

In another aspect, a method of preparing a key-press structure comprises forming a frame that includes a main portion and two reflecting portions. The reflecting portions each have a reflective surface. The main portion has two opposite sides that is connected to the two reflecting portions. The method further comprises forming characters on the internal surface of a plurality of keys, and disposing said keys in the main portion of the frame.

DETAILED DESCRIPTION OF THE PREFERRED EMBODIMENTS

Figure 1:
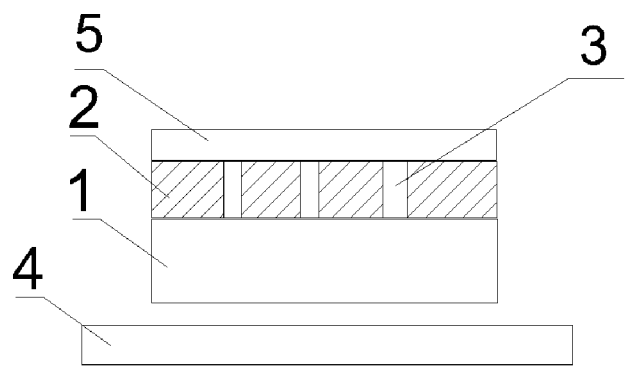
FIG. 1 is a sketch map of the traditional key-press structure.
Figure 2:
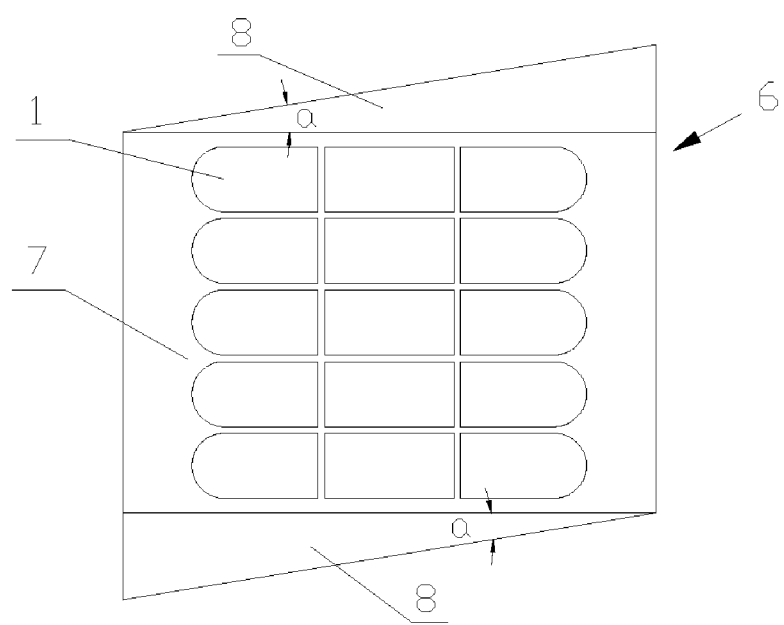
FIG. 2 is a sketch map of the plane structure of the key-press and the frame according to one embodiment of the present invention.
Figure 3:
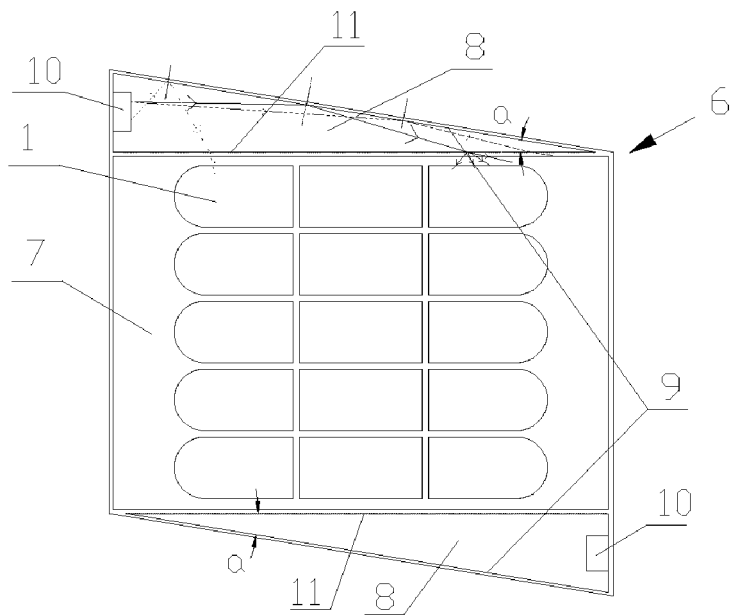
FIG. 3 is a sketch map of the back structure of the key-press and the frame.

The key-press structure and the preparing method according to one embodiment of the present disclosure are illustrated in detail below in view of the drawings. As FIG. 2 and FIG. 3 show, the key-structure comprises a frame (6) and a plurality of keys (1) disposed in said frame (6). Said frame (6) comprises a main portion (7) and two reflecting portions (8) formed on the two opposite sides of the main portion (7). Said reflecting portion (8) has a reflective surface (9) facing toward the main portion (7). A light source (10) is disposed in or next to the reflecting portion (8). Said keys (1) are disposed in the main portion (7). Said main portion (7) and said keys (1) are made up of transparent material, and characters are formed on the internal surface of said keys (1). As used herein, transparent materials include both transparent and translucent materials so long as the characters are visible when light is irradiated at the key-press.

The characters of said keys (1) may be formed via any suitable method known to persons having ordinary skills in the art, such as laser carving. Said main portion (7) can be in any suitable shape, such as a rectangle, a substantially rectangular shape, or a semi-circular shape. In one example, said main portion (7) is a rectangle. Said reflection portion (8) can be in any suitable shape, such as a triangle, a substantially triangular shape, or a trapezoid. In one example, said reflecting portion (8) is a triangle. One side of each triangular reflecting portion (8) is one of the two opposite sides of the rectangular main portion (7). The surface of one of the other two sides of each triangular reflecting portion (8) is the reflective surface (9). The light source (10) is located near the surface of the third side of each triangular reflecting portion (8).

Preferably, said reflecting portion (8) is a right-angled triangle. The relatively long right-angled side of said right-angled triangle is one side of the said rectangular main portion (7). The surface of the hypotenuse of said right-angled triangle is the reflective surface (9). The angle α between said hypotenuse and the relatively long right-angled side is about 5-10°. Said two opposite sides of the main portion (7) where the reflecting portions (8) are formed have a scattering surface (11).

As FIG. 3 shows, to use the light source (10) sufficiently, the light transmitted from the light source (10) to the reflective surface (9) is preferably substantially totally reflected from the reflective surface (9) and incidents to the scattering surface (11), where the light is scattered and the scattered light passes to each key (1). This can be accomplished by disposing upon or coating the reflective surface (9) with a reflective material, such as mirror effect silver, reflective stainless steel metallic layer, a reflective paint and so on. Preferably, mirror effect silver is used. Said scattering surface (11) is a matted surface which can ensure that the light reflected by the mirror surface will be scattered thereon, thus the keys (1) will receive uniform light. Preferably, said light source (10) is an LED. Said LED can be any color. The characters on the crystal key-press exhibit different colors under light sources of different colors. The characters appear to be crystal clear, and have a high stereoscopic effect.

To limit the light loss of the LED to a maximal degree, mirror effect silver is coated on said two opposite sides of said rectangular main portion (7). Thus the light from the LED will repeatedly reflect when it reaches the inside surfaces of the frame (6).

To maximize the crystal clear effect and the stereoscopic effect, the exterior surface of the frame 6 can be coated with an opaque layer.

The transparent material used in said main portion (7) and said keys (1) can be crystal, glass, or transparent polycarbonate or polymethyl methacrylate. Preferably, it is transparent crystal.

Crystal is a transparent $SiO_2$ crystal. The main component is $SiO_2$. The integrated crystal is hexagonal cone cylinder; the specific gravity is about 2.7; rigidity is higher than about 7; melting point is above about 1713° C.; reflective index is about 2.0; and total reflection angle is about 30°. It also has good performance in temperature, acid, and alkaline resistance, and has stable chemical properties.

A method of preparing the keys (1) and frame (6) with a thickness of about 0.6 mm-1.5 mm from crystal is described as follows.

The crystal material is heated until melted. The melted crystal material is injected into a mold for the keys (1) and another mold for the frame (6). Then the crystal material is molded by cooling to form the keys (1) and frame (6). Alternatively, the crystal material can be cut into pieces according to the shapes of the keys (1) and frame (6). Then the pieces are polished to form the keys (1) and frame (6). Said methods of heating the crystal material until melted and of cutting the crystal material for polishing molding are well-known in the art.

A method of preparing the key-press structure comprises forming said frame (6) with said reflection surface 9, and disposing the light source (10) in or next to said reflecting portion (8) of said frame (6). The method further comprises forming the characters on the internal surface of the keys (1) via internal carving, and disposing said keys (1) inside said main portion (7) of said frame (6).

Said internal carving can be laser internal carving. The principle of the laser carving is as follows. By focusing the laser light properly, the energy density of the laser is controlled such that it is lower than the damage threshold of the material before the laser enters the processing area to be internally carved, while it is higher than the damage threshold of the material when the laser enters the processing area to be internally carved. The laser is controlled to produce pulses within a short time, the energy of the laser can heat and break the carven material instantly to produce a plurality of tiny white points.

According to one embodiment, the molded crystal key 1 is fixed on a key-press fixture. The keys are carved using a laser carving equipment. Preferably, a 532 nm wavelength Diode Pumped Solid-State Green Laser is selected, and the internal carving power is about 10-15 w. The carved character on key 1 is preferably made of a plurality of white cracking points, which are formed in the laser carving process. Meanwhile the carving layer number can be determined according to the thickness of the key-press 1. For example, 2 layers can be carved if the key-press 1 is thicker than about 1 mm such that the effect will be better than one carved layer. The keys can be internally carved individually to form the various characters. Alternatively, the keys on the key-structure can be carved simultaneously.

The key-press structure and the preparing method according to the embodiment of the present invention use a crystal material to prepare the key-press. The characters are carved on the internal surface of the key-press. Utilizing the full reflection principles, the point light source of different colors from the LED irradiates on the reflection surface of the right-angled triangular reflection portion which is coated with mirror effect silver, where the point light source is turned to line light sources. Since the character carved in the key is made up of various small white points, when the light incidents from the side of the key-press, the cracked white points will render the light different from the light in other un-carved area. Thus, the characters will exhibit clearly and have a crystal clear and stereoscopic effect. Further, as the characters are carved on the internal surface of the key-press, which is different from the traditional printed key-press, the characters on the key-press will not be worn out.

According to another embodiment of the present invention, the key-press is an integral structure. The characters on the key-press are internally carved at once. The characters on the keys are formed on the internal surface of the integral key-press structure. This method shortens the molding and carving time, and improves productivity. Further, referring to FIG. 4, a light source (1) disposed at the side of the key-press can illuminate all the characters (3) on the integral key-press (2), in the absence of any light guide. Because the key-press is an integral structure, it can be used as touch screens for various applications, such as laptop computers.

Figure 4:
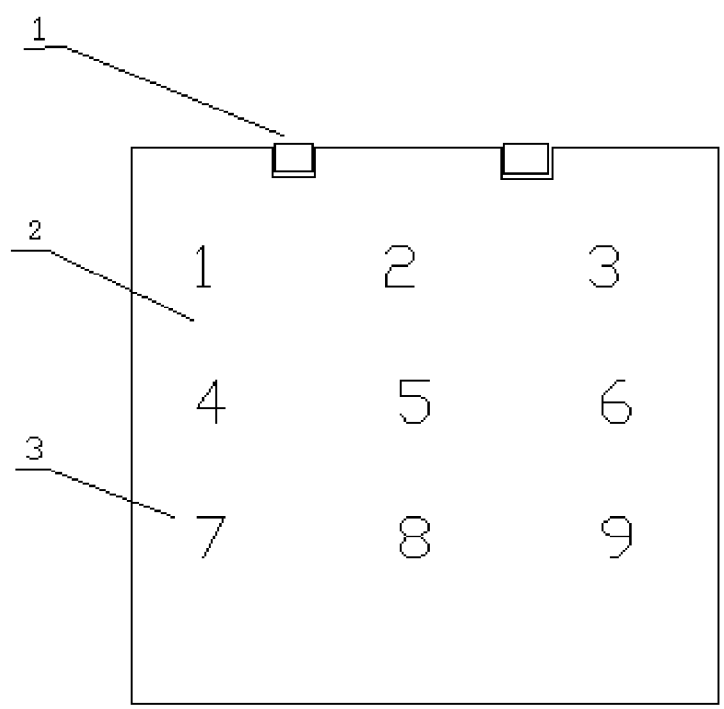
FIG. 4 is a sketch map of the plane structure of the key-press according to another embodiment of the present invention.

Still referring to FIG. 4, a method of preparing the key-press structure is provided. Starting materials, such as crystals or glass, are cut into pieces according to the shape of the desired key-press. Then the pieces are polished along the peripheries of the pieces to form the integral key-press structures (2). An LED light source (1) is disposed on one side of the key-press. In order to efficiently utilize the light source, the three sides of the key-press other than the side with the light source can be coated with a reflective material.

The integral key-press structure is then fixed on a key-press fixture. The keys are carved using a laser carving equipment, as described in the first embodiment of the present invention, to form characters (3) on the internal surface of the keys.

Many modifications and other embodiments of the present disclosure will come to mind to one skilled in the art to which the present disclosure pertains having the benefit of the teachings presented in the foregoing description; and it will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A key-press structure comprising:
   a frame and a plurality of keys disposed in said frame,
   wherein said frame comprises a main portion and two reflecting portions, the main portion having two opposite sides and the two reflecting portions disposed on the two opposite sides of the main portion, respectively,
   wherein each of said reflecting portions has a reflective surface facing toward the main portion, and
   wherein said keys are made of a transparent material, and the keys comprise characters formed on the internal surfaces of said keys, whereby light is directed from the two opposite sides of the main portion and across the internal surfaces of said keys.

2. The key-press structure according to claim 1, wherein said main portion is a rectangle and said reflecting portion is a triangle.

3. The key-press structure according to claim 2, wherein one side of each triangular reflecting portion combines with one of the two opposite sides of the rectangular main portion.

4. The key-press structure according to claim 3, wherein the surface of one of the other two sides of each triangular reflecting portion is the reflective surface.

5. The key-press structure according to claim 2, wherein said triangle is a right-angled triangle, wherein the relatively long leg of said right-angled triangle combines with one side of said rectangular main portion, the surface of the hypotenuse of said right-angled triangle is the reflective surface.

6. The key-press structure according to claim 5, wherein the angle between said hypotenuse and the relatively long leg is about 5-10°.

7. The key-press structure according to claim 1, wherein said two opposite sides of the main portion each have a scattering surface.

8. The key-press structure according to claim 1, wherein the surface of said frame is coated with an opacity layer.

9. The key-press structure according to claim 1, wherein the characters of said keys are laser carved.

10. The key-press structure according to claim 9, wherein the characters are made of a plurality of cracking points formed in the laser carving.

11. The key-press structure according to claim 10, wherein the cracking points are tiny white points.

12. The key-press structure according to claim 1, further comprising a light source disposed adjacent to the reflecting portion.

13. The key-press structure according to claim 12, wherein said light source is an LED light.

14. The key-press structure according to claim 1, wherein said transparent material is selected from the group consisting of crystal, glass, transparent polycarbonate, polymethyl methacrylate, and combinations thereof.

15. The key-press structure according to claim 1, wherein the characters are formed on the plurality of keys simultaneously.

16. The key-press structure according to claim 1, wherein the characters are formed on the plurality of keys separately.

17. A method of preparing a key-press structure comprising:
   forming a frame that includes a main portion and two reflecting portions, the reflecting portions each having a reflective surface, the main portion having two opposite sides that is connected to the two reflecting portions;
   forming characters on the internal surfaces of a plurality of keys; and
   disposing said keys in the main portion of the frame, whereby light is directed from the two opposite sides of the main portion and across the internal surfaces of said keys.

18. The method according to claim 17, further comprising forming a scatter surface on the two opposite sides by polishing the opposite sides of the main portion where the reflecting portion is formed to obtain a matted surface.

19. The method according to claim 17, wherein the characters are formed by internal carving.

20. The method according to claim 19, wherein said internal carving is carving by laser.

* * * * *